United States Patent
Monta et al.

(10) Patent No.: US 9,424,464 B2
(45) Date of Patent: Aug. 23, 2016

(54) MONITORING SYSTEM, MONITORING METHOD, MONITORING PROGRAM, AND RECORDING MEDIUM IN WHICH MONITORING PROGRAM IS RECORDED

(71) Applicant: OMRON Corporation, Kyoto-Shi (JP)

(72) Inventors: Yoshito Monta, Otsu (JP); Mizuki Furuta, Kyoto (JP); Kiyoaki Tanaka, Otsu (JP)

(73) Assignee: OMRON CORPORATION, Kyoto-shi (JP)

( * ) Notice: Subject to any disclaimer, the term of this patent is extended or adjusted under 35 U.S.C. 154(b) by 0 days.

(21) Appl. No.: 14/492,532

(22) Filed: Sep. 22, 2014

(65) Prior Publication Data

US 2015/0098632 A1   Apr. 9, 2015

(30) Foreign Application Priority Data

Oct. 8, 2013  (JP) ................. 2013-210759

(51) Int. Cl.
  *G06K 9/00* (2006.01)
  *G06F 17/30* (2006.01)
  *G06K 9/62* (2006.01)

(52) U.S. Cl.
  CPC ..... *G06K 9/00268* (2013.01); *G06F 17/30247* (2013.01); *G06K 9/00255* (2013.01); *G06K 9/00295* (2013.01); *G06K 9/00778* (2013.01); *G06K 9/6201* (2013.01)

(58) Field of Classification Search
  None
  See application file for complete search history.

(56) References Cited

U.S. PATENT DOCUMENTS

| | | | |
|---|---|---|---|
| 2002/0016740 A1* | 2/2002 | Ogasawara | 705/26 |
| 2002/0191817 A1* | 12/2002 | Sato et al. | 382/118 |
| 2007/0189585 A1* | 8/2007 | Sukegawa et al. | 382/118 |
| 2013/0182917 A1* | 7/2013 | Kritt et al. | 382/118 |
| 2013/0266196 A1* | 10/2013 | Kono et al. | 382/118 |
| 2014/0161316 A1* | 6/2014 | Golan et al. | 382/103 |
| 2014/0270370 A1* | 9/2014 | Saito et al. | 382/103 |

FOREIGN PATENT DOCUMENTS

| | | |
|---|---|---|
| JP | 2007-158421 A | 6/2007 |
| WO | 03/047258 A1 | 6/2003 |

* cited by examiner

*Primary Examiner* — Li Liu
(74) *Attorney, Agent, or Firm* — Nutter McClennen & Fish LLP; John J. Penny, Jr.

(57) ABSTRACT

A monitoring system for monitoring a target is described. The monitoring system extracts features of a person's face from an image obtained from the face of the person and determines whether the person's face matches a person included in a list containing facial features of multiple individuals.

4 Claims, 12 Drawing Sheets

FIG. 4

| Date | Clock time | Target person ID | Camera ID | Remarks |
|---|---|---|---|---|
| 2013/6/15 | 10:02 | 003 | C1 | Entry |
| 2013/6/15 | 10:05 | 001 | C1 | Entry |
| 2013/6/15 | 10:07 | 003 | C2 | Sales section ○○ |
| 2013/6/15 | 10:10 | 002 | C1 | Entry |
| 2013/6/15 | 10:12 | 001 | C3 | Sales section ×× |
| ⋮ | ⋮ | ⋮ | ⋮ | ⋮ |
| 2013/6/15 | 10:35 | 003 | C5 | Exit |
| ⋮ | ⋮ | ⋮ | ⋮ | ⋮ |

FIG. 10

| Date | Clock time | Target person ID | Camera ID | Remarks |
|---|---|---|---|---|
| 2013/6/15 | 10:02 | 003 | C4 | Sales section △△ |
| 2013/6/15 | 10:05 | 001 | C4 | Sales section △△ |
| 2013/6/15 | 10:07 | 003 | C2 | Sales section ○○ |
| 2013/6/15 | 10:10 | 002 | C5 | Sales section □□ |
| 2013/6/15 | 10:12 | 001 | C3 | Sales section ×× |
| | | ⋮ | | |
| 2013/6/15 | 10:35 | 002 | C2 | Sales section ○○ |
| | | ⋮ | | |

FIG. 11A

| ID | Face feature quantity |
|---|---|
| 001 | AA1,BB1,CC1,…,XX1 |
| 002 | AA2,BB2,CC2,…,XX2 |
| 003 | AA3,BB3,CC3,…,XX3 |
| 004 | AA4,BB4,CC4,…,XX4 |
| 005 | AA5,BB5,CC5,…,XX5 |
| … | … |
|  |  |

FIG. 11B

| ID | Face feature quantity |
|---|---|
| 002 | AA2,BB2,CC2,…,XX2 |
| 004 | AA4,BB4,CC4,…,XX4 |
| 005 | AA5,BB5,CC5,…,XX5 |

FIG. 12

| ID | Monitoring target flag | Face feature quantity |
|---|---|---|
| 001 |  | AA1,BB1,CC1,...,XX1 |
| 002 | 1 | AA2,BB2,CC2,...,XX2 |
| 003 |  | AA3,BB3,CC3,...,XX3 |
| 004 | 1 | AA4,BB4,CC4,...,XX4 |
| 005 | 1 | AA5,BB5,CC5,...,XX5 |
| ... | ... | ... |

MONITORING SYSTEM, MONITORING METHOD, MONITORING PROGRAM, AND RECORDING MEDIUM IN WHICH MONITORING PROGRAM IS RECORDED

CROSS-REFERENCE TO RELATED APPLICATION

This application is based on Japanese Patent Application No. 2013-210759 filed with the Japan Patent Office on Oct. 8, 2013, the entire contents of which are incorporated herein by reference.

BACKGROUND

The disclosure relates to a monitoring system that monitors a monitoring target area using captured images of the monitoring target area, a monitoring method, a monitoring program, and a recording medium in which the program is recorded.

Nowadays, a monitoring system in which a face recognition technology is used is becoming popular. JP 2007-158421 A discloses an example of the face recognition technology. In the monitoring system, a face feature quantity of a person of a monitoring target is previously stored in a storage, a face area is detected from an input image input from a monitoring camera, a feature quantity is extracted in each face area, the extracted feature quantity is compared to and matched against the face feature quantity stored in the storage, thereby detecting the person of the monitoring target.

When the monitoring system is constructed with a plurality of imaging devices, not only the monitoring is performed at one place, but also when and where the person of the monitoring target exists can be detected at a plurality of places, which allows analysis of a line of movement of the person of the monitoring target.

In the monitoring system, the face feature quantity of the person of the monitoring target is previously stored as a face feature quantity list in the storage, and there is an advantage that a monitoring task can automatically be performed without visual management of an observer. Therefore, the monitoring system is used in not only the monitoring of a suspicious person but also a trend analysis of other persons, such as a good customer in a store.

However, in the monitoring system, with increasing number of persons of the monitoring targets, the number of face feature quantity subject to the matching increases, and therefore unfortunately a load necessary for matching processing and processing time also increase. In practice, this problem should be solved.

An object of the disclosure is to efficiently perform the matching processing even if many possible persons of the monitoring targets exist.

SUMMARY

Specifically, according to a first aspect of the configuration, a monitoring system is configured to monitor a monitoring target area using captured images of the monitoring target area, the monitoring system comprising:

one first imaging device or a plurality of first imaging devices;

one second imaging device or a plurality of second imaging devices;

an image acquisition unit configured to take in images captured by the first imaging device and the second imaging device as an input image;

a face feature quantity extraction unit configured to extract a face feature quantity of a person from the input image;

a storage storing a face feature quantity list, comprising face feature quantities of persons, is stored; and a matching unit configured to determine whether a person in the input image matches a person of the face feature quantity list by comparing the face feature quantities of the face feature quantity list to the face feature quantity extracted by the face feature quantity extraction unit, wherein the storage is used to store a first face feature quantity list and a second face feature quantity list therein, the second face feature quantity list is a subset or an empty set of the first face feature quantity list, the matching unit matches the face feature quantity of the person in the input image against each face feature quantity of the first face feature quantity list when the input image is the image captured by the first imaging device, and the matching unit matches the face feature quantity of the person in the input image against each face feature quantity of the second face feature quantity list when the input image is the image captured by the second imaging device.

BRIEF DESCRIPTION OF THE DRAWINGS

FIG. 4 is a chart schematically illustrating a data structure of a monitoring result list in the first embodiment;

FIG. 10 is a chart schematically illustrating a data structure of a monitoring result list in the third embodiment;

FIGS. 11A and 11B are charts illustrating examples of data structures of a registrant list and a monitoring target list; and FIG. 12 is a chart illustrating an example of another data structure of the registrant list and the monitoring target list.

DETAILED DESCRIPTION

Hereinafter, exemplary embodiments of the disclosure will be described with reference to the drawings.

<First Embodiment>
(System Configuration)

Figure 1:
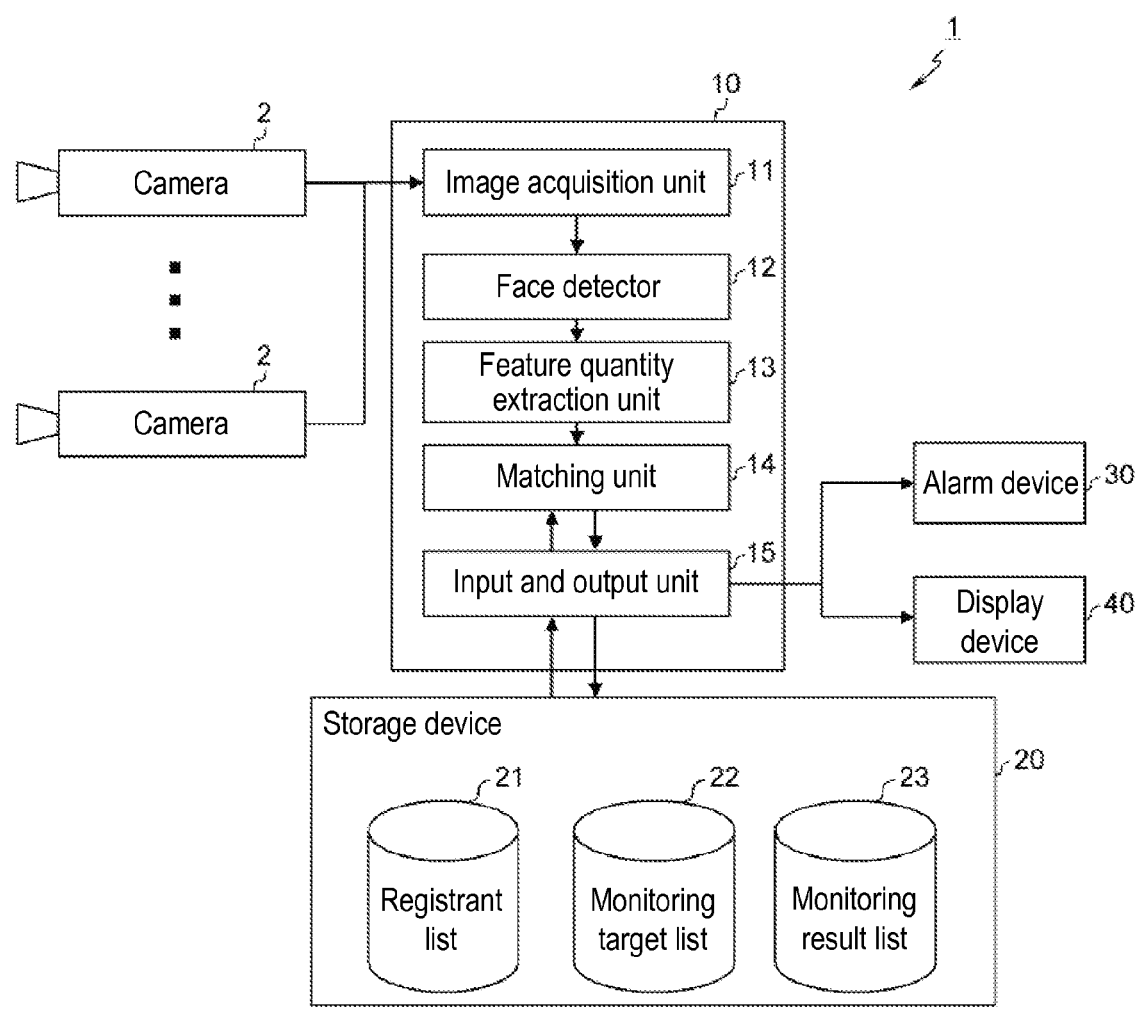
FIG. 1 is a diagram schematically illustrating a functional configuration of a monitoring system according to a first embodiment of the disclosure.

FIG. 1 is a diagram schematically illustrating a functional configuration of a monitoring system according to a first embodiment of the disclosure. Using a monitoring camera installed in a facility such as a store or an airport, a monitoring system 1 monitors whether a suspicious person enters the facility or where the suspicious person is in the facility, and alerts a manager as needed. In the first embodiment, by way of example, the monitoring system 1 is introduced to the store having one entrance and one exit.

The monitoring system 1 includes a plurality of cameras 2, a monitoring device 10, a storage device 20, an alarm device 30, and a display device 40.

The camera 2 is constructed with a digital video camera or a digital still camera. In the first embodiment, it is assumed that five cameras 2 are connected to the monitoring device 10. The cameras 2 are distinguished from one another by camera IDs C1 to C5, and it is assumed that the camera C1 is installed in the entrance, that the camera C5 is installed in the exit, and that the cameras C2 to C4 are installed in different sales sections of the store.

Figure 2:
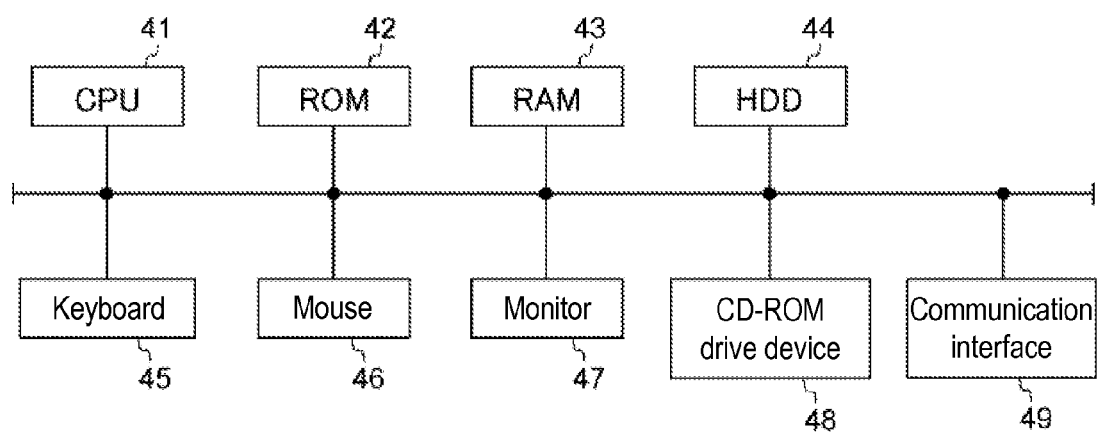
FIG. 2 is a diagram illustrating a hardware configuration when the monitoring system is constructed with a general-purpose personal computer.

For example, the monitoring device 10 can be constructed with a general-purpose personal computer. FIG. 2 is a diagram schematically illustrating a hardware configuration of the monitoring device 10 when the general-purpose personal computer is used. In the hardware configuration of the monitoring device 10, a CPU (Central Processing Unit) 41, a ROM (Read-Only Memory) 42, a RAM (Random Access Memory) 43, an HDD (Hard Disk Drive) 44, and various input devices are connected to one another through a bus. In this case, the display device 40 may double as a monitor 47.

As illustrated in FIG. 1, the monitoring device 10 includes an image acquisition unit 11, a face detector 12, a feature quantity extraction unit 13, a matching unit 14, and an input and output unit 15 as functional elements. In the case that the monitoring device 10 is constructed with the general-purpose personal computer, the CPU 41 executes a monitoring system application program to properly control the ROM 42 and the RAM 43, thereby implementing the functional elements in FIG. 1. All or some of the functional elements may be constructed with a dedicated chip (logic circuit). The monitoring device 10 or the monitoring system 1 may be constructed by using one computer of a combination of a plurality of computers or cloud computing.

The image acquisition unit 11 implements a function of taking in an image captured by the camera 2 together with the camera ID.

The face detector 12 implements a function of detecting a face from the image (input image) taken in by the image acquisition unit 11. Various methods such as template matching and use of luminance gradient information are proposed for detecting the face from the image. However, any method for detecting the face from the image can be used in the disclosure.

The feature quantity extraction unit 13 implements a function of calculating a feature quantity featuring each face detected by the face detector 12. As used herein, the feature quantity means one in which information of the whole face or a region recognized as eyes, a nose, and/or a mouth in the face of a person included in the captured image is quantified. Examples of the feature quantity include luminance information, frequency characteristic information, and information in which a shape, a position, and a size of the region are digitized.

The matching unit 14 implements a function of comparing the feature quantity calculated by the feature quantity extraction unit 13 to a face feature quantity of a subject registered in a later-described registrant list 21 or monitoring target list 22, and estimating whether the person in the input image matches any person registered in any of the above-mentioned lists. For example, the matching unit 14 may estimate whether the person in the input image is identical to any person registered in any of the above-mentioned lists.

The input and output unit 15 implements a function of conducting communication with each list stored in the storage device 20, which includes reading and writing the information from and to each list, and transmitting the information read from each list to the matching unit 14.

The storage device 20 may be constructed with a file server or an NAS (Network Attached Storage), or the built-in HDD 44 may be used as the storage device 20 in the case that the monitoring device 10 is constructed with the general-purpose personal computer. The storage device 20 is not limited to the configuration of the single HDD, but the storage device 20 may be constructed with a plurality of HDDs.

The registrant list 21, the monitoring target list 22, and a monitoring result list 23 are provided in the storage device 20.

The registrant list 21 is one in which the face feature quantity of a potential monitoring target is stored. In the first embodiment, it is assumed that the face feature quantity of the suspicious person or a person who makes a trouble in the past, together with a registrant ID, are also stored in the registrant list 21.

The monitoring target list 22 is one in which the face feature quantity of a registrant registered in the registrant list 71 and who is expected to exist in the store is stored at a certain time point during the monitoring. The monitoring target list 22 is empty in an initial state. After the monitoring is started, data (face feature quantity) of the registrant in which the image is captured by the camera C1 installed in the entrance is copied from the registrant list 21 to the monitoring target list 22 (registration), and the data of the registrant is deleted from the monitoring target list 22 in the case that the image of the registrant is captured by the camera C5 installed in the exit. The data registered in and deleted from the monitoring target list 22 is described in detail later.

In the first embodiment, the registrant list 21 and the monitoring target list 22 are separately provided as illustrations in FIGS. 11A and 11B. Alternatively, for example, the registrant list 21 and the monitoring target list 22 may be provided in a form of one list as illustrated in FIG. 12, all pieces of data in the list may be used as the registrant list 21, and the data of the monitoring target flag may be added in order to obtain the monitoring target list 22.

The monitoring result list 23 is one in which a monitoring result relating to the store is stored. The monitoring result can be recorded in any way. For example, as illustrated in FIG. 4, an ID of the person detected as the matching result, the camera ID, and a place or behavior of the monitoring target person estimated from the camera ID can be recorded together with a date and time when the matching processing is performed.

For example, the alarm device 30 is constructed with a revolving light or an alarm whistle. Using light or sound, the alarm device 30 notifies a security officer that some sort of affair is generated in the store. In the first embodiment, it is assumed that the alarm device 30 is constructed with the alarm whistle.

For example, the display device 40 is constructed with a liquid crystal monitor. The display device 40 is used when the security officer checks the monitoring result of the store. Examples of a content displayed on the display device 40 include sequential display of the images captured from the cameras C1 to C5, the flow line of a monitoring target person designated by the security officer, and contents of the monitoring result list 23.

(Monitoring Processing)

Figure 3:
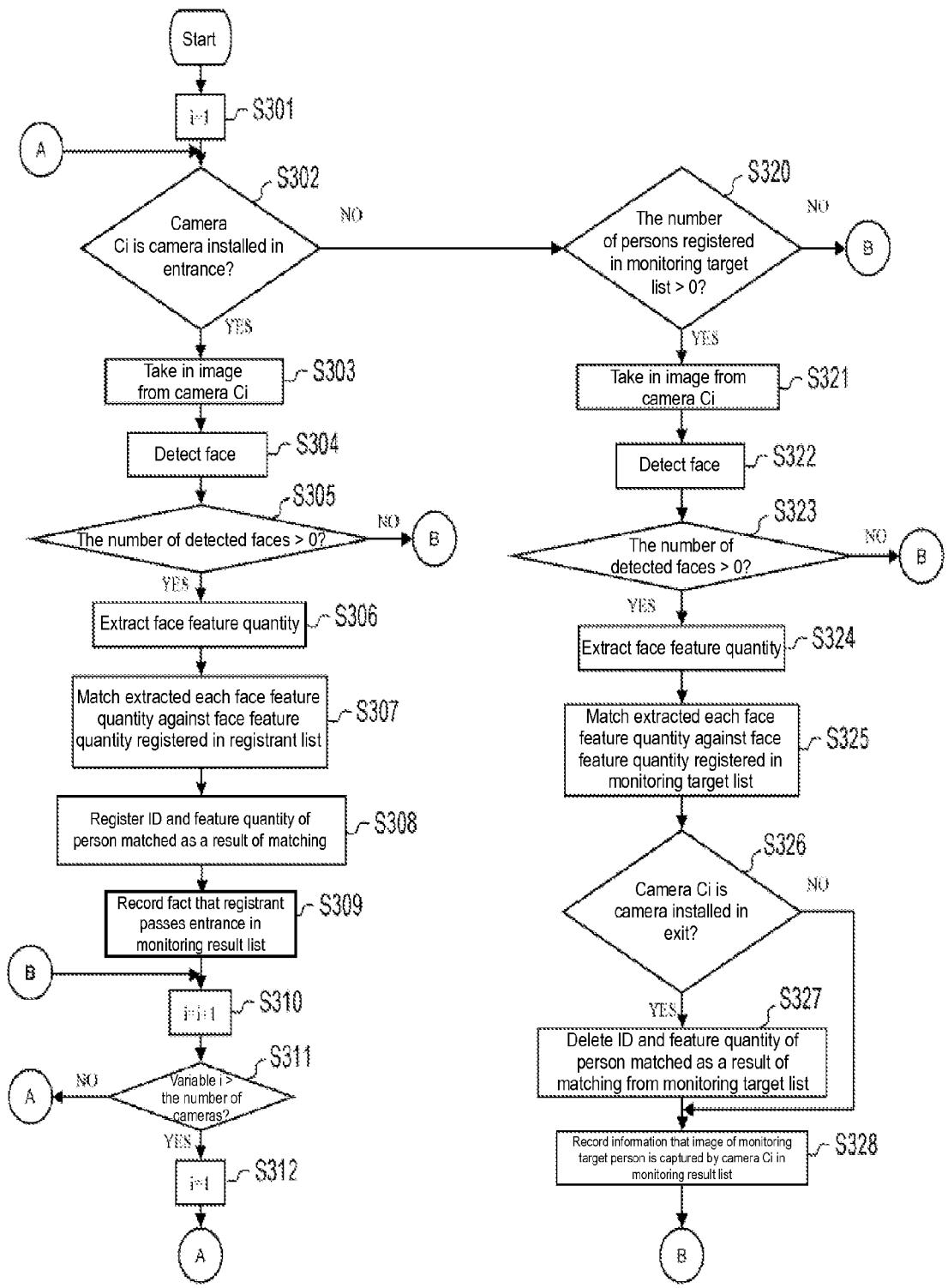
FIG. 3 is a flowchart illustrating a processing flow in the monitoring system of the first embodiment.

Monitoring processing in the monitoring system 1 will be described below with reference to a flowchart in FIG. 3.

When the monitoring is started, a camera reference variable i is initialized (Step S301). It is then determined whether camera Ci is the camera installed in the entrance (Step S302). When the camera Ci is the camera installed in the entrance (YES in Step S302), the image acquisition unit 11 takes in the image from the camera Ci (Step S303).

The taken-in image is transmitted to the face detector 12, and the face detector 12 performs face detection processing (Step S304). As described above, the face may be detected in any existing way.

When the face is not detected from the taken-in image (NO in Step S305), what happens next is that the camera reference variable i is updated to a next value (Steps S310 to S312). On the other hand, when the face is detected from the taken-in image (YES in Step S305), the feature quantity is extracted with respect to each detected face (Step S306).

Then, the matching processing is performed on the extracted feature quantity using the registrant list 21 (Step S307). That is, it is determined whether the detected face matches any of the persons registered in the registrant list 21.

When the detected face is determined to be one of the registrants registered in the registrant list 21 in the matching processing, the face feature quantity of the registrant is copied from the registrant list 21 to the monitoring target list 22 (registration) (Step S308). The fact that the registrant passes the entrance is recorded in the monitoring result list 23 (Step S309). During the processing in Step S309, if there is a need, a facility manager may be notified by activating the alarm device 30, or projecting some sort of display on the display device 40.

When the matching processing is performed to all the faces extracted from the input image, the variable i is incremented, or the variable i is initialized when the variable i exceeds the number of cameras (Steps S310 to S312). Then the flow returns to Step S302.

On the other hand, when the camera Ci is not the camera installed in the entrance (NO in Step S302), a step to check whether any person is registered in the monitoring target list 22 is performed (Step S320). When there is no person registered in the monitoring target list 22 (NO in Step S320), the subsequent processing is skipped. In the case that there is no person registered in the monitoring target list 22, it is considered that no monitoring target person exists in the store.

When there is a person registered in the monitoring target list 22 (YES in Step S320), the image is taken in from the camera Ci (Step S321), and the face is detected (Step S322). When a face or more is detected (YES in Step S323), the face feature quantity of each face is also detected (Step S324). The processing steps in Steps S321 to S324 are identical to those in Steps S303 to S306, and hence detailed description is not repeated.

Then, the matching processing is performed on the extracted feature quantity using the monitoring target list 22 (Step S325). That is, it is determined whether the detected face matches any of the monitoring target persons registered in the monitoring target list 22.

When the detected face is determined to match any of the monitoring target persons registered in the monitoring target list 22 in the matching processing, it is then determined whether the camera Ci is the camera installed in the exit (Step S326). When the camera Ci is not the camera installed in the exit (NO in Step S326), the information relating to the image of the monitoring target person who is captured by the camera Ci is recorded in the monitoring result list 23 (Step S328). When the camera Ci is the camera installed in the exit (YES in Step S326), the image of the monitoring target person is regard to be captured by the camera installed in the exit, namely, it is considered that the monitoring target person exits the store. Therefore, the face feature quantity of the monitoring target person is deleted from the monitoring target list 22 (Step S327), and the fact that the monitoring target person exits the store is recorded in the monitoring result list 23 (Step S328). Similar to the processing in Step S309, during the processing in Step S328, if needed, the facility manager may be notified by activating the alarm device 30, or projecting some sort of display on the display device 40.

When the matching processing is performed to all the faces extracted from the input image, the variable i is incremented, or the variable i is initialized when the variable i exceeds the number of cameras (Steps S310 to S312). Then the flow returns to Step S302.

As described above, according to the monitoring system 1 of the first embodiment, only the feature quantity extracted from the image captured by a specific camera (in the first embodiment, the camera C1) is matched against all the registrants registered in the registrant list 21, and the feature quantities extracted from the images captured by other cameras are matched only against the monitoring target person registered in the monitoring target list 22 (that is, a subset of the registrant list 21) which consists of data that forms only a part of the data stored in the registrant list 21. Therefore, the processing load necessary for the matching processing can be reduced. Additionally, according to the monitoring system 1 of the first embodiment, the data of the person who is photographed in the image captured by a specific camera (in the first embodiment, the camera C1) and registered in the registrant list 21 is automatically registered in (copied to) the monitoring target list 22, and the data of the person who is photographed in the image captured by a specific camera (in the first embodiment, the camera C5) and registered in the monitoring target list 22 is automatically deleted from the monitoring target list 22. Therefore, the monitoring target list 22 is dynamically constructed, and there is no necessity to manually maintain the monitoring target list 22, hence a monitoring task can be automated.

<Second Embodiment>

(System Configuration)

Figure 5:
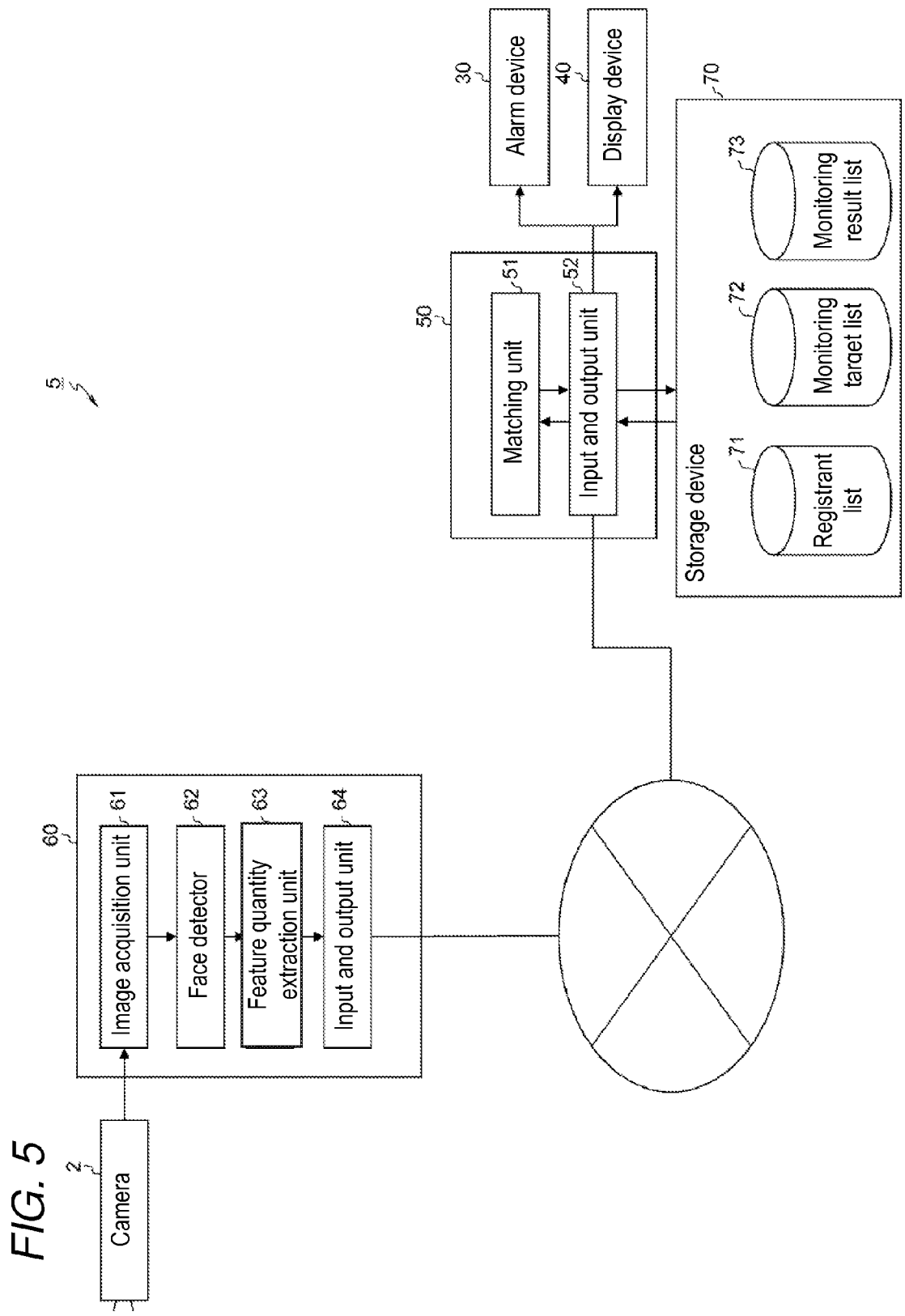
FIG. 5 is a diagram schematically illustrating a functional configuration of a monitoring system according to a second embodiment of the disclosure.

FIG. 5 is a diagram schematically illustrating a functional configuration of a monitoring system according to a second embodiment of the disclosure. A monitoring system 5 of the second embodiment includes a monitoring device 50, a plurality of terminals 60, and a storage device 70, and each terminal 60 is connected to the monitoring device 50 through a network.

In the second embodiment, similar to the first embodiment, the monitoring system 5 is introduced to the store having one entrance and one exit by way of example. The monitoring system 5 includes five terminals 60, and the terminals 60 have respective terminal IDs D1 to D5. It is assumed that the terminal D1 is installed in the entrance, that the terminal D5 is installed in the exit, and that the terminals D2 to D4 are installed in different sales sections of the store.

The terminal 60 is connected to each camera 2. Similarly to the first embodiment, the camera 2 is constructed with the digital video camera or the digital still camera. The terminal 60 includes an image acquisition unit 61, a face detector 62, a feature quantity extraction unit 63, and an input and output unit 64 as the functional elements. Because the functions and operations of the image acquisition unit 61, the face detector 62, and the feature quantity extraction unit 63 are similar to the functions and operations of the image acquisition unit 11, the face detector 12, and the feature quantity extraction unit 13 of the first embodiment, the description will not be repeated.

The input and output unit 64 has a function of sequentially transmitting the feature quantity extracted by the feature quantity extraction unit 63 to the monitoring device 50 together with the terminal ID in response to a request from the monitoring device 50.

On the other hand, an input and output unit 52 of the monitoring device 50 receives the feature quantity and the terminal ID, which are transmitted from each terminal 60, and transmits the feature quantity and the terminal ID to the matching unit 51. The input and output unit 52 retrieves data of a registrant list 71 from the storage device 70 to transmit the data to a matching unit 51 in the case that the terminal ID indicates the terminal installed in the entrance, and the input and output unit 52 retrieves data of a monitoring target list 72 to transmit the data to the matching unit 51 in the case that the terminal ID indicates other terminals. The matching processing is described in detail later.

(Matching Processing)

The monitoring processing in the monitoring system 5 will be described below with reference to flowcharts of FIGS. 6 and 7.

Figure 6:
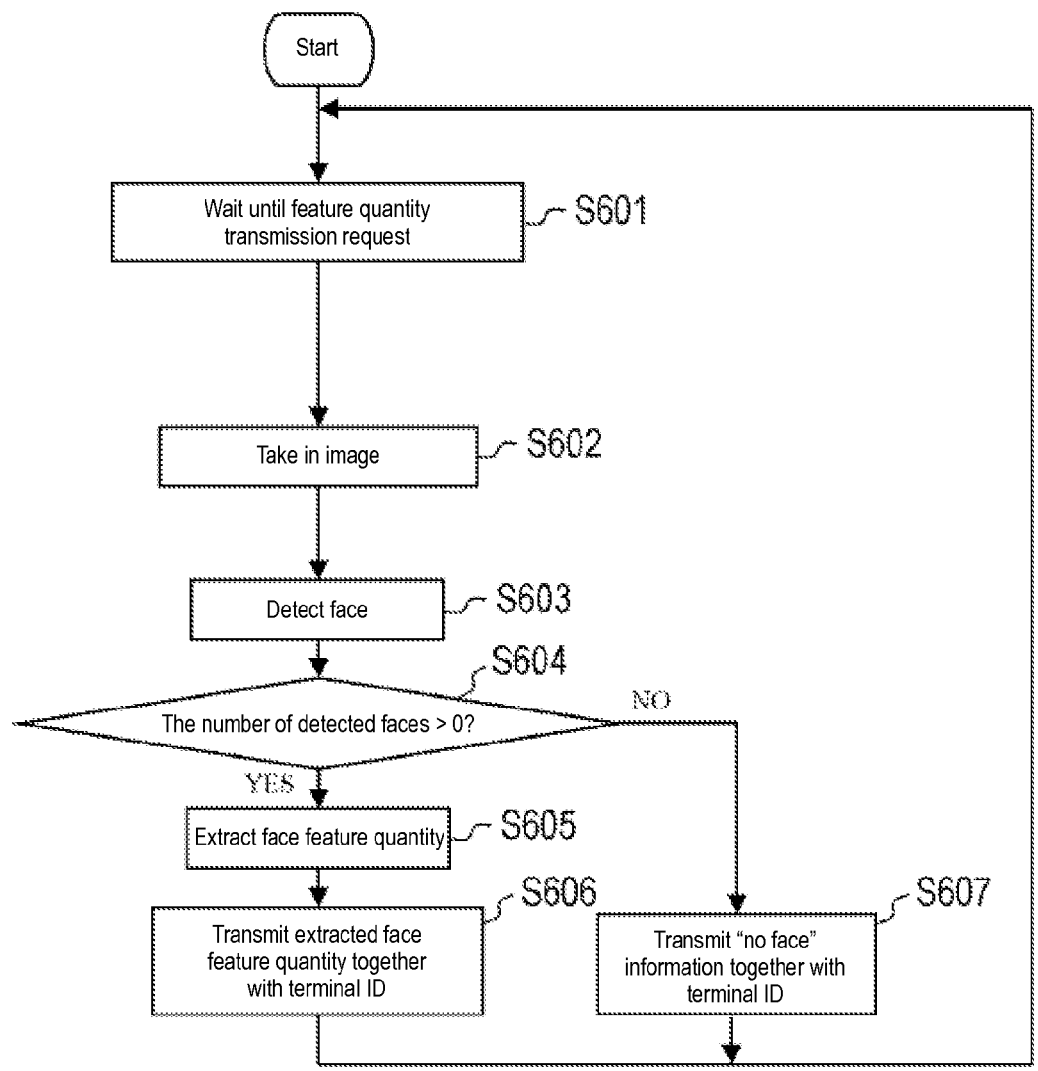
FIG. 6 is a flowchart illustrating a processing flow in a terminal of the second embodiment.

FIG. 6 is a flowchart illustrating the matching processing in each terminal Di (i=1 to 5).

When the monitoring is started, each terminal Di waits for a request from the monitoring device 50 (Step S601).

When receiving the request for the transmission of the feature quantity from the monitoring device 50, each terminal Di takes in the image from the camera 2 (Step S602), and performs the face detection processing on the taken-in image (Step S603). When the face is detected (YES in Step S604), the feature quantity extraction processing is performed on the detected face(s) (Step S605). Because the pieces of processing in Steps S603 and S605 are similar to those in Steps S304 and S306 of the first embodiment, the description will not be repeated.

When the feature quantity extraction processing is completed in relation to all the detected face(s), the terminal Di transmits the feature quantity together with the terminal ID through the input and output unit 64 (Step S606). Then the terminal Di returns to the waiting state.

On the other hand, when the face is not detected (NO in Step S604), the terminal Di transmits the information that no face is detected together with the terminal ID through the input and output unit 64 (Step S607). Then the terminal Di returns to the waiting state.

Figure 7:
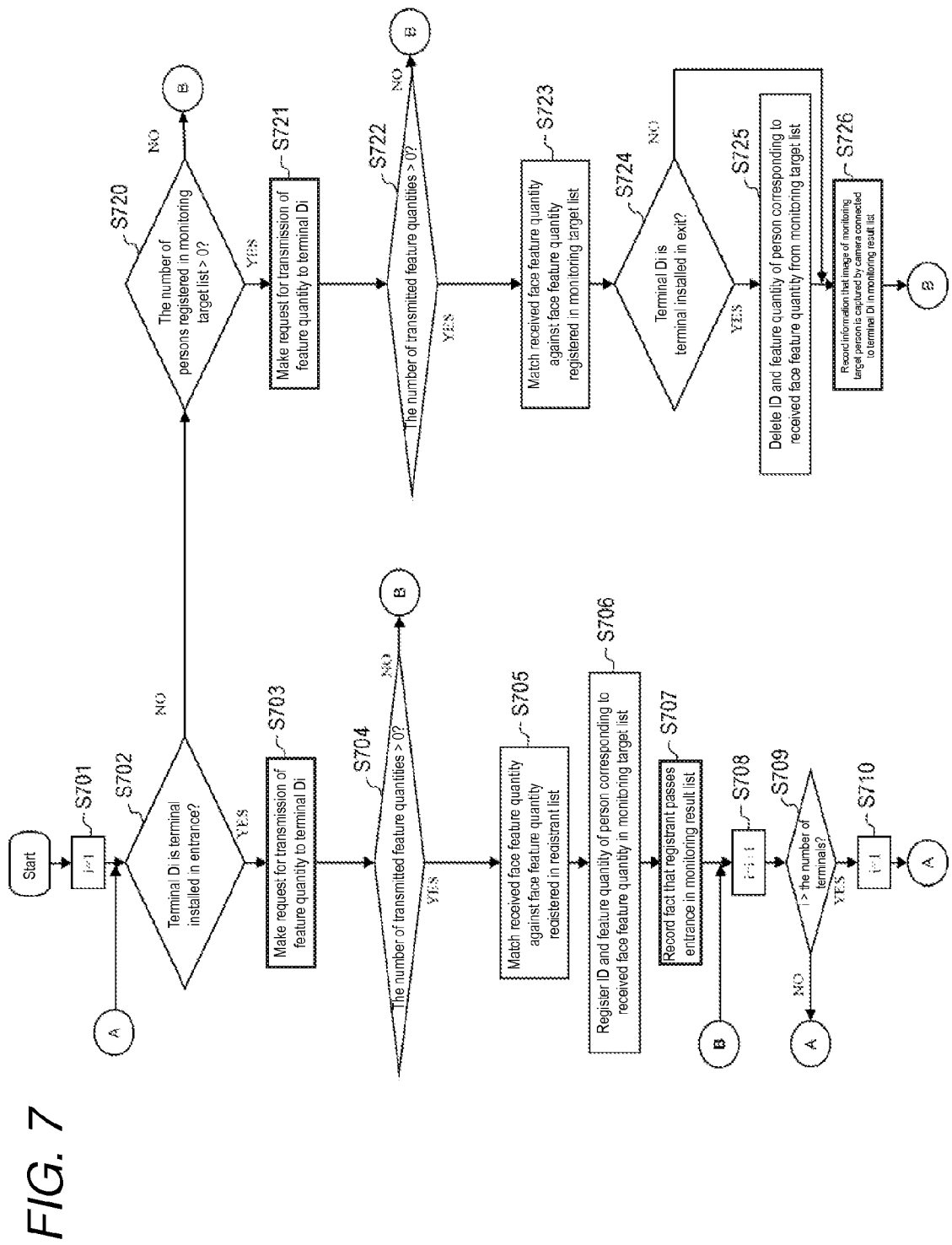
FIG. 7 is a flowchart illustrating a processing flow in a monitoring device of the second embodiment.

FIG. 7 is a flowchart illustrating the monitoring processing in the monitoring device 50.

When the monitoring is started, the terminal reference variable i is initialized (Step S701). It is then determined whether the terminal Di is the terminal installed in the entrance (Step S702).

When the terminal Di is the terminal installed in the entrance (YES in Step S702), the input and output unit 52 makes a request for the transmission of the feature quantity to the terminal Di (Step S703). When the feature quantity is not included in the information received by the input and output unit 52 (NO in Step S704), the subsequent matching processing is skipped.

When the feature quantity is included in the information received from the terminal Di by the input and output unit 52 (YES in Step S704), the feature quantity is compared to the feature quantity of each registrant registered in the registrant list 71 (Step S705). That is, it is determined whether the person expressed by the transmitted feature quantity is one of the persons registered in the registrant list 71.

When the person expressed by the transmitted feature quantity is determined to be one of the persons registered in the registrant list 71 in the matching processing in Step S705, the face feature quantity of the registrant is copied to (registered in) the monitoring target list 72 (Step S706). The fact that the registrant passes the entrance is recorded in the monitoring result list 73 (Step S707). During the processing in Step S707, if needed, the facility manager may be notified by activating the alarm device 30, or projecting some sort of display on the display device 40.

When the matching processing is performed to all the feature quantities transmitted from the terminal Di, the variable i is incremented, or the variable i is initialized when the variable i exceeds the number of terminals (Steps S708 to S710). Then the flow returns to Step S702.

On the other hand, when the terminal Di is not the terminal installed in the entrance (NO in Step S702), a step of checking whether the person registered in the monitoring target list 72 exists is performed (Step S720). When the person registered in the monitoring target list 72 does not exist (NO in Step S720), the subsequent processing is skipped. In the case that the person registered in the monitoring target list 72 does not exist, it is considered that no person of the monitoring target exists in the store.

When there is a person registered in the monitoring target list 72 (YES in Step S720), the input and output unit 52 makes the request for the transmission of the feature quantity to the terminal Di (Step S721).

Then, using the monitoring target list 72, the matching processing is performed om the feature quantity received by the input and output unit 52 (Step S723). That is, it is determined whether the detected face is one of the faces of the monitoring target persons registered in the monitoring target list 72.

When the detected face is determined to be one of the faces of the monitoring target persons registered in the monitoring target list 72 in the matching processing in Step S723, it is then determined whether the terminal Di is the terminal installed in the exit (Step S724). When the terminal Di is not the terminal installed in the exit (NO in Step S724), the information that the image of the monitoring target person is captured by the camera connected to the terminal Di is recorded in the monitoring result list 73 (Step S726). When the terminal Di is the terminal installed in the exit (YES in Step S724), it is considered that the image of the monitoring target person is captured by the camera connected to the terminal Di installed in the exit, namely, it is considered that the monitoring target person exits the store. Therefore, the data of the monitoring target person is deleted from the monitoring target list 72 (Step S725), and the fact that the monitoring target person exits the store is recorded in the monitoring result list 73 (Step S726). Similar to the processing in Step S707, during the processing in Step S726, if needed, the facility manager may be notified by activating the alarm device 30, or projecting some sort of display on the display device 40.

When the matching processing is performed on all the faces extracted from the input image, the variable i is incremented, or the variable i is initialized when the variable i exceeds the number of cameras (Steps S708 to S710). Then the flow returns to Step S702.

As described above, according to the monitoring system 5 of the second embodiment, only the feature quantity extracted from the image captured by a specific camera (in the second embodiment, the camera connected to the terminal D1) is matched against all the registrants registered in the registrant list 71, and the feature quantities extracted from the images captured by other cameras are matched only against the monitoring target person registered in the monitoring target list 72 (that is, a subset of the registrant list 71) which consists of data that forms only a part of the data stored in the registrant list 71. Therefore, the processing load necessary for the matching processing can be reduced. Additionally, similarly to the first embodiment, according to the monitoring system 5 of the second embodiment, the data of the person who is photographed in the image captured by a specific camera (in the second embodiment, the camera connected to the terminal D1) and registered in the registrant list 71 is automatically registered in (copied to) the monitoring target list 72, and the data of the person who is photographed in the image captured by a specific camera (in the second embodiment, the camera connected to the terminal D5) and registered in the monitoring target list 72 is automatically deleted from the monitoring target list 72. Therefore, the monitoring target list 72 is dynamically constructed, and there is no necessity to manually maintain the monitoring target list, hence the monitoring task can be automated.

In the second embodiment, because of the configuration provides for the plurality of terminals 60 which are connected to the monitoring device 50, the monitoring system 5 is suitable for use in places such as a large-scale facility and a chain store.

<Modifications>

In the first and second embodiments, the storage device 20 and the storage device 70 are directly connected to the monitoring device 10 and the monitoring device 50, respectively. Alternatively, the storage device 20 and the storage device 70 may be connected to the monitoring device 10 and the monitoring device 50, receptively, through the network.

In the first and second embodiments, the information of the person captured by the camera installed in the exit is deleted from the monitoring target list 22 or the monitoring target list 72. Alternatively, this configuration may be removed, and the face feature quantity of the person may be eliminated from the monitoring target list 22 or the monitoring target list 72 after a given time elapses since the image of the person disappears from all the cameras, or all the pieces of data of the person captured by the camera installed in the exit may be deleted from the monitoring target list 22 or the monitoring target list 72 at a predetermined clock time (for example, closing time).

<Third Embodiment>

(System Configuration)

Figure 8:
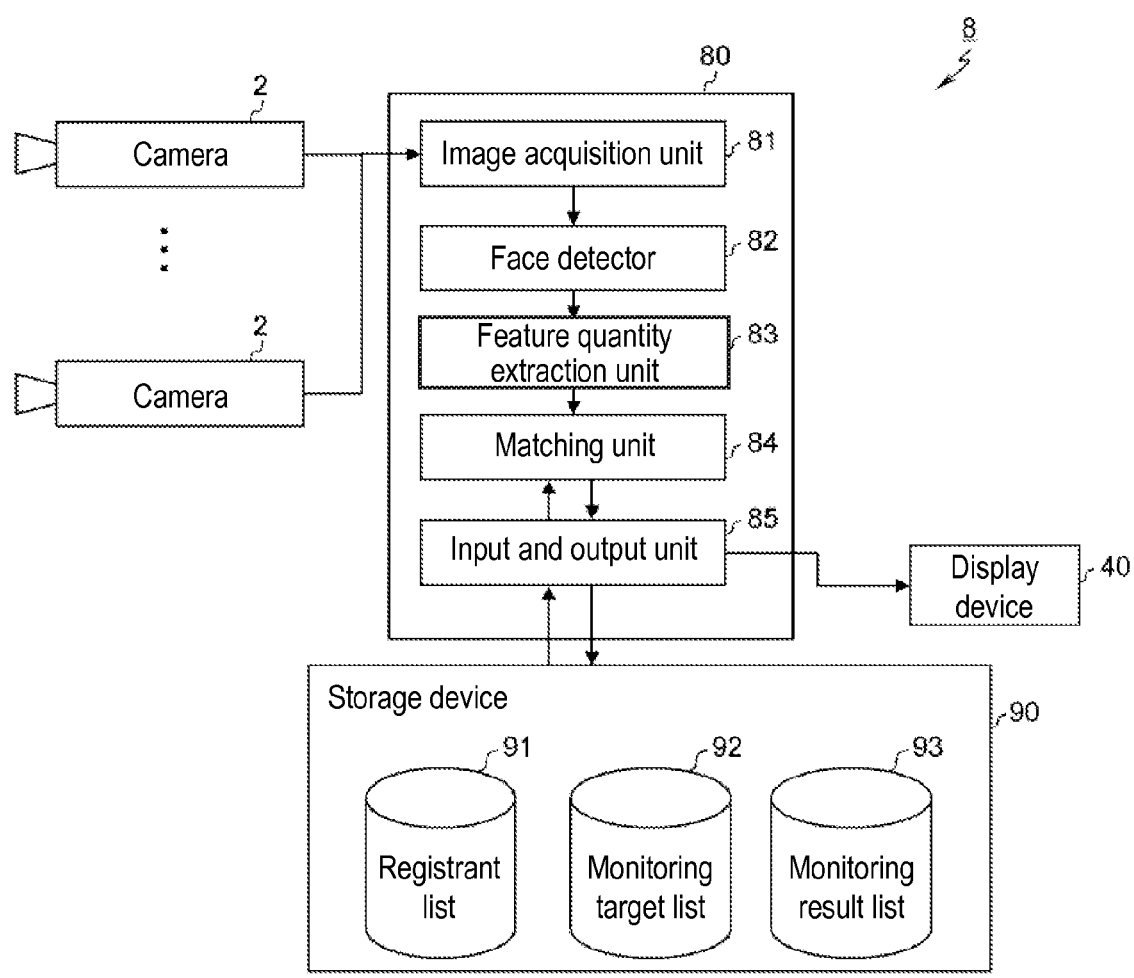
FIG. 8 is a diagram schematically illustrating a functional configuration of a monitoring system according to a third embodiment of the disclosure.

FIG. 8 is a diagram schematically illustrating a functional configuration of a monitoring system according to a third embodiment of the disclosure. A monitoring system 8 of the third embodiment may be used for various purposes, such as to monitor an existence of a good customer in a facility (such as the store) by using the monitoring camera installed in the facility.

The monitoring system 8 includes the plurality of cameras 2, a monitoring device 80, a storage device 90, and the display device 40.

Similar to the first and second embodiments, the camera 2 is constructed with the digital video camera or the digital still camera. In the third embodiment, it is assumed that the five cameras 2 are connected to the monitoring device 80. The cameras 2 are distinguished from one another by camera IDs C1 to C5, and it is assumed that the camera C1 is installed in a sales section for the purpose of specifying a customer, and that the cameras C2 to C5 are installed in different sales sections of the store to monitor the specified customer. However, the camera C1 may be installed in a same place as that of one of the cameras C2 to C5 (for example, the entrance or a cash desk).

Similar to the first and second embodiments, the monitoring device 80 can be constructed, for example, with the general-purpose personal computer. In the case that the general-purpose personal computer is used, the description is not repeated because the hardware configuration of the monitoring device 80 is similar to that of the first embodiment in FIG. 2.

As illustrated in FIG. 8, the monitoring device 80 includes an image acquisition unit 81, a face detector 82, a feature quantity extraction unit 83, a matching unit 84, and an input and output unit 85 as the functional elements. Because the functions of the image acquisition unit 81, the face detector 82, the feature quantity extraction unit 83, the matching unit 84, and the input and output unit 85 are similar to those of the image acquisition unit 11, the face detector 12, the feature quantity extraction unit 13, the matching unit 14, and the input and output unit 15 of the first embodiment, the description is not repeated.

The hardware configuration of the storage device 90 is similar to that of the storage device 20 of the first embodiment.

A registrant list 91, a monitoring target list 92, and a monitoring result list 93 are provided in the storage device 90.

The registrant list 91 is one in which the face feature quantity of a potential monitoring target is stored. In the third embodiment, it is assumed that the face feature quantities of all the persons who visit the store are stored in the registrant list 91 together with a registrant ID, the number of visit times, and a date of last visit.

The monitoring target list 92 is one in which the face feature quantity of the registrant (such as the good customer) is stored at a certain time point during the monitoring. The monitoring target list 92 is empty in the initial state. After the monitoring is started, the data of the registrant captured in an image by the camera C1 and satisfying a predetermined condition is copied from the registrant list 91 to the monitoring target list 92 (registration) as good customer data. The data registered in and deleted from the monitoring target list 92 is described in detail later.

The monitoring result list 93 is one in which the monitoring result of the store is stored. The monitoring result can be recorded in any way. In the third embodiment, as illustrated in FIG. 10, it is assumed that the ID of the person detected as the matching result, the camera ID, and the place of the monitoring target person estimated from the camera ID, are recorded together when the matching processing is performed.

For example, the display device 40 is constructed with the liquid crystal monitor. The display device 40 is used when a sales staff checks the monitoring result of the store. Examples of the content that is displayed on the display device 40 include the sequential display of the images captured from the cameras C1 to C5, the line of movement of the monitoring target person (designated by the sales staff), and the contents of the monitoring result list 93.

(Monitoring Processing)

Figure 9:
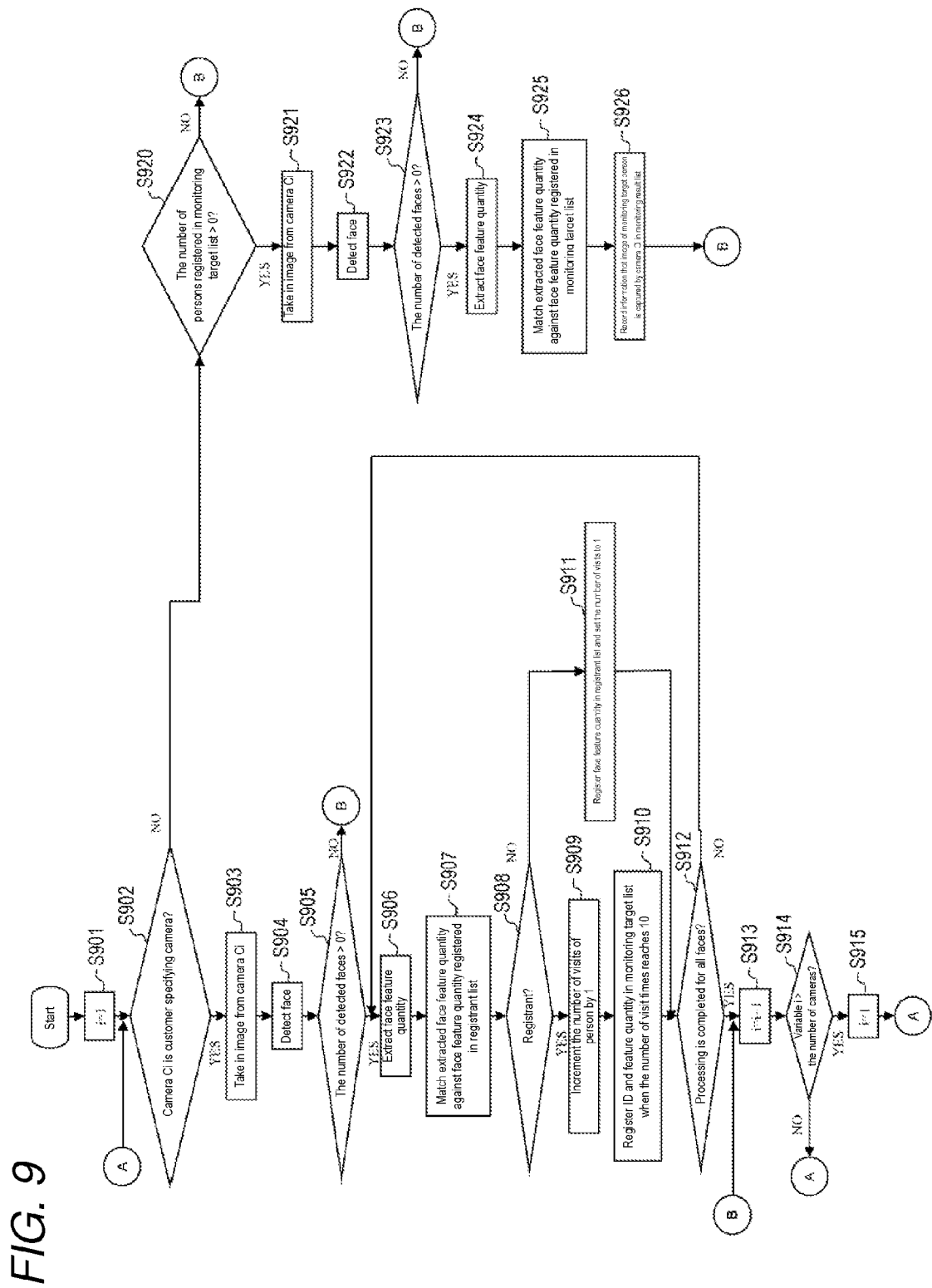
FIG. 9 is a flowchart illustrating a processing flow in the monitoring system of the third embodiment.

The monitoring processing of the monitoring system 8 will be described below with reference to a flowchart in FIG. 9.

When the monitoring is started, the camera reference variable i is initialized (Step S901). It is then determined whether the camera Ci is the customer specifying camera (Step S902). When the camera Ci is the customer specifying camera (YES in Step S902), the image acquisition unit 81 takes in the image from the camera Ci (Step S903).

The taken-in image is transmitted to the face detector 82, and the face detector 82 performs the face detection processing (Step S904).

When the face is not detected from the taken-in image (NO in Step S905), the subsequent face matching processing is skipped and the camera reference variable i is updated to a next value (Steps S912 to S915). On the other hand, when the face is detected from the taken-in image (YES in Step S905), the feature quantity is extracted with respect to the detected face (Step S906).

Then, the matching processing is performed on the extracted feature quantity using the registrant list 91 (Step S907). That is, it is determined whether the detected face is one of the persons registered in the registrant list 91.

When the detected face is determined to be one of the registrants registered in the registrant list 91 in the matching processing (YES in Step S908), and if the last visit of the registrant is not the current day, the number of visits of the registrant is incremented by 1 (Step S909). When the number of visit times of the registrant reaches a predetermined value, such as 10, the face feature quantity of the registrant is copied from the registrant list 91 to the monitoring target list 92 (registration) (Step S910).

On the other hand, when the face is determined to be not any one of the registrants registered in the registrant list 91 in the matching processing (NO in Step S908), the face feature quantity is registered in the registrant list 91, and the number of visits is set to 1 (Step S911).

When the matching processing is performed on all the faces extracted from the input image (YES in Step S912), the variable i is incremented, or the variable i is initialized when the variable i exceeds the number of cameras (Steps S913 to S915). Then the flow returns to Step S902.

On the other hand, when the camera Ci is not the customer specifying camera (NO in Step S902), a step to check whether there is any person registered in the monitoring target list 92 is performed (Step S920). When no person is registered in the monitoring target list 92 (NO in Step S920), the subsequent processing is skipped. In the case that there is no person registered in the monitoring target list 92, it is considered that the monitoring target customer (such as a good customer) does not exist in the store.

When there is at least a person registered in the monitoring target list 92 (YES in Step S920), the image is taken in from the camera Ci (Step S921), and the face is detected (Step S922). When the face is detected (YES in Step S923), the face feature quantity of each face is detected (Step S924). The pieces of processing in Steps S921 to S924 are identical to those in Steps S303 to S306 in the first embodiment, and therefore the detailed description is not repeated.

Then, the matching processing is performed on the extracted feature quantity using the monitoring target list 92 (Step S925). That is, it is determined whether the detected face is one of the monitoring target persons registered in the monitoring target list 92.

When the detected face is determined to be one of the monitoring target persons registered in the monitoring target list 92 in the matching processing, the information relating to the image of the monitoring target person who is captured by the camera Ci is recorded in the monitoring result list 93 (Step S926).

When the matching processing is performed on all the faces extracted from the input image, the variable i is incremented, or the variable i is initialized when the variable i exceeds the number of cameras (Steps S912 to S915). Then the flow returns to Step S902.

As described above, according to the monitoring system 8 of the third embodiment, only the feature quantity extracted from the image captured by a specific camera (in the third embodiment, the camera C1) is matched against all the registrants registered in the registrant list 91, and the feature quantities extracted from the images captured by other cameras are matched only against the monitoring target person registered in the monitoring target list 92 (that is, a subset of the registrant list 91) which consists of data that forms only a part of the data stored in the registrant list 91. Therefore, the processing load necessary for the matching processing can be reduced.

In the third embodiment, the face feature quantity of the monitoring target list 92 is not deleted, but the person whose number of visits reaches the predetermined number of times is registered in the monitoring target list 92. Alternatively, the face feature quantity of the monitoring target list 92 may be deleted on one or more conditions. For example, the data of the person indicating that the number of elapsed days from the date of last visit is greater than or equal to a predetermined number of days (that is, the number of days the person has not visited the store) may be deleted from the monitoring target list 92.

In the third embodiment, the person whose number of visits reaches the predetermined number of times is automatically registered in the monitoring target list 92. Alternatively, the sales staff may manually register the face feature quantity from the registrant list 91 (such as a list of all the customers) in the monitoring target list 92.

In the disclosure, in order to achieve the object, monitoring is performed on fewer number of persons as compared to the number of possible monitoring target persons.

According to the above configurations, the monitoring system includes the first face feature quantity list and the second face feature quantity list that is of the subset or the empty set of the first face feature quantity list, and the person in the image captured by the second imaging device is matched against the second face feature quantity list (that is, the matching is performed on less number of feature quantities than the number of feature quantities registered in the first face feature quantity list). Therefore, with respect to the image captured by the second imaging device, a processing load in the matching processing is reduced and there is a shortening of the time necessary for the matching.

There are various methods for producing the second face feature quantity list. For example, according to the disclosure, the monitoring system may include a monitoring target person information input and output unit. In such monitoring system, the monitoring target person information input and output unit may register a face feature quantity of a person of the first face feature quantity list in the second face feature quantity list, when the input image is the image captured by the first imaging device, and a person in the input image is determined to be the person of the first face feature quantity list as a result of matching the face feature quantity of the person in the input image against each face feature quantity of the first face feature quantity list. Alternatively, the monitoring system may further include a monitoring target person information input and output unit. In the monitoring system, the monitoring target person information input and output unit may register a face feature quantity of a person of the first face feature quantity list in the second face feature quantity list, when the input image is the image captured by the first imaging device, a person in the input image is determined to be the person of the first face feature quantity list as a result of matching the face feature quantity of the person in the input image against each face feature quantity of the first face feature quantity list, and the number of times the person in the input image is determined to be the person of the first face feature quantity list is greater than or equal to a predetermined number of times. Accordingly, only the face feature quantity of the person who passes through a specific place or satisfies a specific condition is registered from the first face feature quantity list into the second face feature quantity list, and the second face feature quantity list includes only the person who really needs to be monitored and the second face feature quantity list can be produced dynamically.

According to the disclosure, the monitoring system may further include one or a plurality of third imaging devices. In such monitoring system, the matching unit may match a face feature quantity of a person in the input image against each face feature quantity of the second face feature quantity list when the input image is an image captured by the third imaging device, and the monitoring target person information input and output unit may delete the face feature quantity of the person of the second face feature quantity list from the second face feature quantity list, when the person in the input image captured by the third imaging device is determined to be the person of the second face feature quantity list as a result of matching of the face feature quantity of the person in the input image captured by the third imaging device against each face feature quantity of the second face feature quantity list. Alternatively, in the monitoring system, the monitoring target person information input and output unit may delete all the face feature quantities of the second face feature quantity list at a previously-set clock time. Accordingly, the face feature quantity of the person who is not required to be monitored is deleted from the second face feature quantity list, any increase of the amount of data in the second face feature quantity list is prevented, and any increase of the time necessary for the matching is also prevented.

According to a second aspect of the disclosure, a monitoring method in which a monitoring system including a first face feature quantity list and a second face feature quantity list that is of a subset or an empty set of the first face feature quantity list monitors a monitoring target area using an image captured by an imaging device that is installed so as to partially capture the monitoring target area, and the monitoring method includes the steps of: taking in the image captured by the imaging device as an input image; extracting a face feature quantity of a person from the input image; and matching the face feature quantity extracted from the input image against each face feature quantity of the first face feature quantity list when the input image is an image captured by an imaging device satisfying a predetermined condition, and matching the face feature quantity of the person in the input image against each face feature quantity of the second face feature quantity list when the input image is an image captured by an imaging device except the imaging device satisfying the predetermined condition.

The monitoring method of the second aspect may further include the step of producing the second face feature quantity list as a subset of the first face feature quantity list. Particularly, in the monitoring method of the second aspect, in the step of producing the second face feature quantity list as the subset of the first face feature quantity list, the second face feature quantity list may be produced as the subset of the first face feature quantity list by registering the face feature quantity of the person of the first face feature quantity list in the second face feature quantity list, when the input image is the image captured by the imaging device satisfying the predetermined condition, and the person in the input image is determined to be a person of the first face feature quantity list as a result of matching the face feature quantity extracted from the input image captured by the imaging device satisfying the predetermined condition against each face feature quantity of the first face feature quantity list.

According to a third aspect of the disclosure, the disclosure includes a program configured to cause a computer, the computer configured to be able to use a first face feature quantity list and a second face feature quantity list that is of a subset or an empty set of the first face feature quantity list, to perform the steps of: taking in an image captured by an imaging device as an input image; extracting a face feature quantity of a person from the input image; and matching the face feature quantity extracted from the input image against each face feature quantity of the first face feature quantity list when the input image is an image captured by an imaging device satisfying a predetermined condition, and matching the face feature quantity of the person in the input image against each face feature quantity of the second face feature quantity list when the input image is an image captured by an imaging device except the imaging device satisfying the predetermined condition.

According to a fourth aspect of the disclosure, the disclosure includes a program configured to cause a computer, the computer configured to be able to use a first face feature quantity list and a second face feature quantity list that is of a subset or an empty set of the first face feature quantity list, to perform the steps of: taking in a face feature quantity extracted by a face feature quantity extraction device; and matching the face feature quantity against each face feature quantity of the first face feature quantity list when the face feature quantity extraction device is connected to an imaging device satisfying a predetermined condition, and matching the face feature quantity against each face feature quantity of the second face feature quantity list when the face feature quantity extraction device is connected to an imaging device except the imaging device satisfying the predetermined condition.

According to a fifth aspect of the disclosure, the program of the third and fourth aspects is non-temporally recorded in a computer-readable recording medium. The above configurations and pieces of processing can be combined as long as technical inconsistency is not generated.

According to the disclosure, even if many possible monitoring target parsons exist, the matching processing is performed fewer monitoring targets. Therefore, the processing load in the matching processing is reduced.

The invention claimed is:

1. A monitoring system configured to monitor a monitoring target area using captured images of the monitoring target area, the monitoring system comprising:
   a first imaging device;
   a second imaging device;
   an image acquisition unit configured to take in images captured by the first imaging device and the second imaging device as an input image;

a face feature quantity extraction unit configured to extract a face feature quantity of a person from the input image;

a storage configured to store a face feature quantity list comprising face feature quantities of persons; a matching unit configured to determine whether a person in the input image matches a person of the face feature quantity list by comparing the face feature quantities of the face feature quantity list to the face feature quantity extracted by the face feature quantity extraction unit; and a monitoring target person information input and output unit;

wherein:

the storage is configured to store a first face feature quantity list and a second face feature quantity list therein, the second face feature quantity list being a subset or an empty set of the first face feature quantity list;

the matching unit is configured to match the face feature quantity of the person in the input image against each face feature quantity of the first face feature quantity list when the input image is the image captured by the first imaging device, and the matching unit is configured to match the face feature quantity of the person in the input image against each face feature quantity of the second face feature quantity list when the input image is the image captured by the second imaging device; and the monitoring target person information input and output unit is configured to register a face feature quantity of a person of the first face feature quantity list in the second face feature quantity list, when the input image is the image captured by the first imaging device, a person in the input image is determined to match the person of the first face feature quantity list as a result of matching of the face feature quantity of the person in the input image against each face feature quantity of the first face feature quantity list, and the number of times the person in the input image is determined to match the person of the first face feature quantity list is greater than or equal to a predetermined number of times.

2. The monitoring system according to claim 1, further comprising:

a third imaging device;

Wherein:

the image acquisition unit is further configured to take in images captured by the third imaging device as an input image;

the matching unit is configured to match a face feature quantity of a person in the input image against each face feature quantity of the second face feature quantity list when the input image is an image captured by the third imaging device; and the monitoring target person information input and output unit is configured to delete the face feature quantity of the person of the second face feature quantity list from the second face feature quantity list, when the person in the input image is determined to match the person of the second face feature quantity list as a result of matching the face feature quantity of the person in the input image captured by the third imaging device against each face feature quantity of the second face feature quantity list.

3. The monitoring system according to claim 1, wherein the monitoring target person information input and output unit is configured to delete all the face feature quantities of the second face feature quantity list at a previously-set clock time.

4. A computer-readable non-transitory recording medium in which a program is stored, wherein the program is configured to cause a computer, the computer configured to be able to use a first face feature quantity list and a second face feature quantity list that is of a subset or an empty set of the first face feature quantity list, to:

take in a face feature quantity extracted by a face feature quantity extraction device; and match the face feature quantity against each face feature quantity of the first face feature quantity list when the face feature quantity extraction device is connected to an imaging device satisfying a predetermined condition, and match the face feature quantity against each face feature quantity of the second face feature quantity list when the face feature quantity extraction device is connected to an imaging device except the imaging device satisfying the predetermined condition;

wherein:

the second face feature quantity list is produced as the subset of the first face feature quantity list by registering the face feature quantity of the person of the first face feature quantity list in the second face feature quantity list, when the person in the input image is determined to match a person of the first face feature quantity list as a result of matching a number of times the face feature quantity extracted from the input image captured by the imaging device satisfying the predetermined condition against each face feature quantity of the first face feature quantity list, and the number of times is greater than or equal to a predetermined number of times.

* * * * *